Feb. 10, 1970  R. A. BEWALDA, JR., ET AL  3,494,520

AUTOMATIC TRIMMING MACHINE FOR MOLDED PLASTIC ARTICLES

Filed March 8, 1968  4 Sheets-Sheet 1

INVENTORS
ROBERT L. SCHOENECK
ROBERT L. O'BRIEN
ROBERT A. BEWALDA, JR.

BY

Thomas O. Kloehn

ATTORNEY

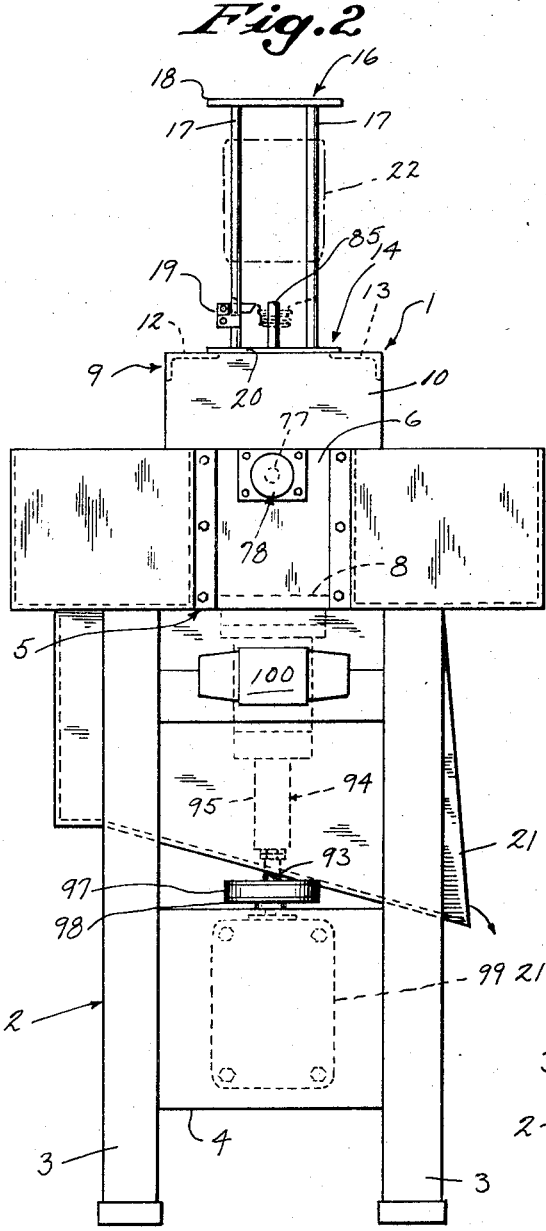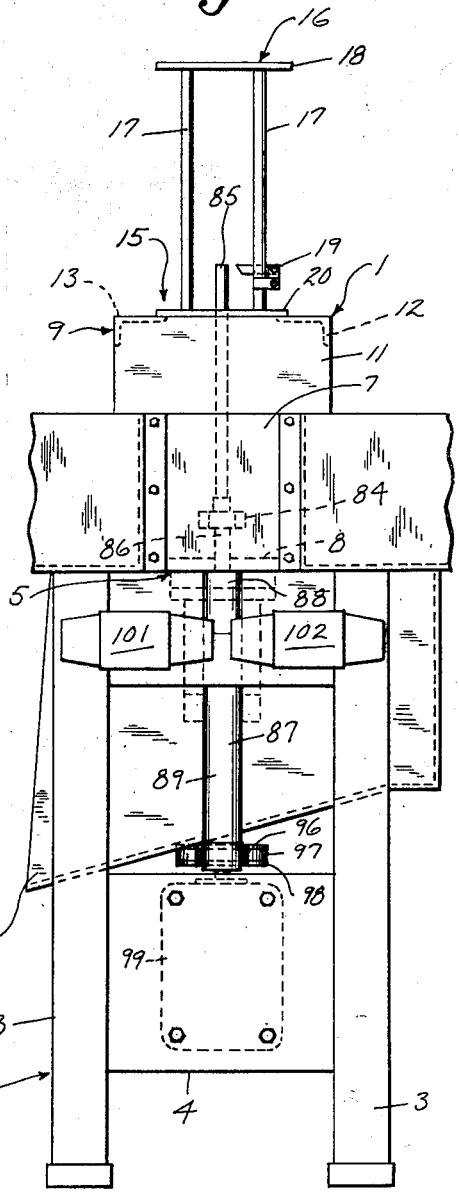

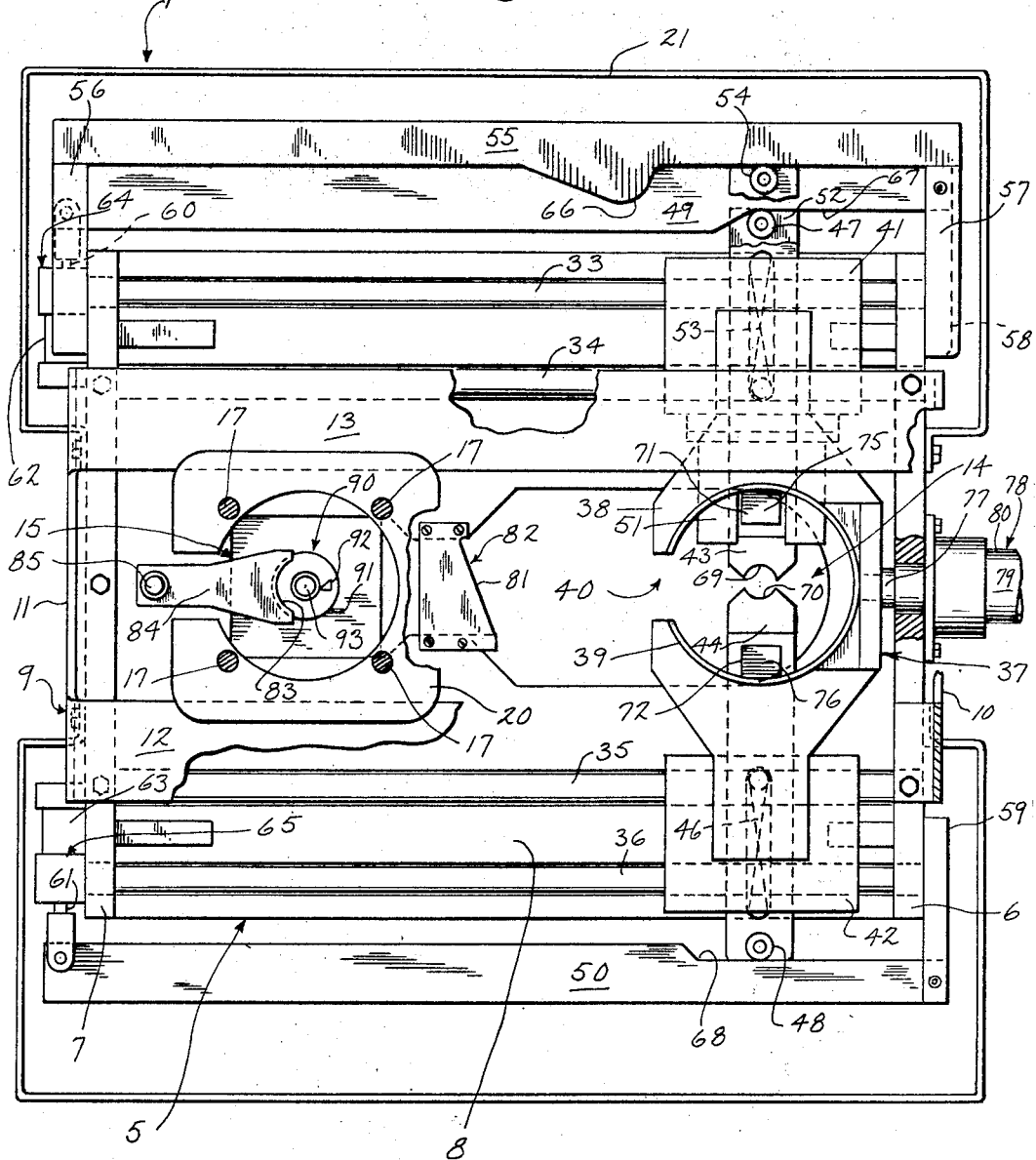

Feb. 10, 1970   R. A. BEWALDA, JR., ET AL   3,494,520
AUTOMATIC TRIMMING MACHINE FOR MOLDED PLASTIC ARTICLES
Filed March 8, 1968
4 Sheets-Sheet 4
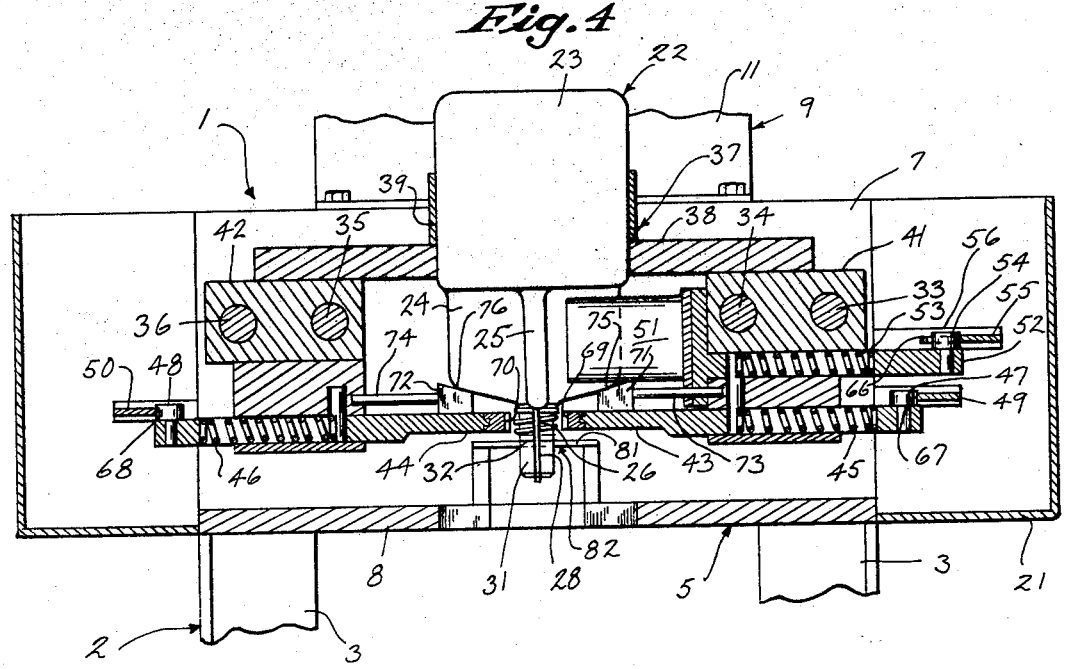
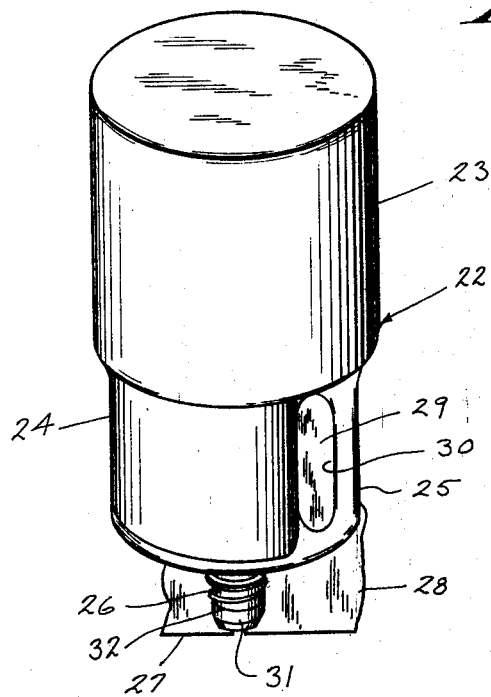
INVENTORS
ROBERT L. SCHOENECK
ROBERT L. O'BRIEN
ROBERT A. BEWALDA, JR.
BY
ATTORNEY

# United States Patent Office 3,494,520
Patented Feb. 10, 1970

3,494,520
AUTOMATIC TRIMMING MACHINE FOR
MOLDED PLASTIC ARTICLES
Robert A. Bewalda, Jr., Robert L. O'Brien, and Robert
L. Schoeneck, Milwaukee, Wis., assignors to Poly
Plastic Bottles, Inc., Milwaukee, Wis., a corporation
of Wisconsin
Filed Mar. 8, 1968, Ser. No. 711,574
Int. Cl. B26d 7/06; B23p 23/00; B65h 35/00
U.S. Cl. 225—94                              7 Claims

ABSTRACT OF THE DISCLOSURE

A machine for trimming plastic bottles uses linear cams to actuate reciprocating deflashing dies. A bottle drops into a reciprocating carriage. The carriage supports a pair of reciprocating jaws for deflashing the neck of the bottle, and another reciprocating die for removing flashing from the handle. As the carriage moves toward the discharge end of the machine it passes over a stationary knife which removes the flashing from the end of the bottle, and a vertically reciprocating reamer reams the mouth of the bottle. At the discharge end, a reciprocating hand ejects the bottle upward out of the machine.

BACKGROUND OF THE INVENTION

Molded, and particularly blow-molded plastic articles, such as bottles, come from the molding machine with waste flashing clinging to them on thin membranes where the molding dies had joined. The plastic articles are not complete until this flashing waste has been removed. While the flashing can be broken away manually, mass production of plastic articles require a high speed automatic device for performing this operation, if the manufacture of such articles is to be commercially efficient. In addition, when the molded article is a blow-molded plastic bottle, a projection is formed on the end of the neck of the bottle that is connected to the bottle by a relatively thick and tough ring of material that must be cut away, and after it is cut away the mouth of the bottle must be reamed. The machine of the present invention performs all of these deflashing functions automatically.

Most of the prior art automatic machines are rotary machines that receive the bottles at one point and moved them through a series of stations where the various deflashing functions are performed with movable dies and knives. These machines have two major disadvantages. First, they are economical only for very large production runs of identical articles, since the down time to convert the machine for a different shape or size is excessive. Secondly, moving knife blades rapidly deteriorate and frequently break. A trimming machine of the present invention has a relatively short set up time so it is adaptable to relatively small production runs of different types of plastic articles, and it employs a stationary trimming knife which is not subject to the breakage and deterioration experienced with moving knives. While achieving those goals, the machine of the present invention remains fully automatic and capable of high speed production.

SUMMARY OF THE INVENTION

The present invention relates to a trimming machine for molded plastic articles, and more specifically the invention resides in an automatic trimming machine in which the molded plastic article is positioned on a reciprocating carriage that has reciprocating jaws and dies for removing lateral flashings and that rides on a pair of double tracks from an entrance end of said machine to a discharge end while trimming operations are performed on the article.

By the foregoing combination, the present invention provides a comparatively low cost automatic trimming machine capable of providing high output in short run as well as long run production. A minimum time is required for set up of the machine of the present invention so down time for change over is minimized. Moreover, the machine made according to the present invention is very durable and reliable, and hence occasions a minimum of down time for maintenance. Equally important is the fact that quality of operation is in no way reduced in order to obtain the foregoing advantages. On the contrary, a trimming machine made according to the present invention performs its function thoroughly, with a minimum of rejects and manifests simplicity of operation and great stability.

BRIEF DESCRIPTION OF THE DRAWINGS

FIG. 2 is a front end elevation of the machine shown in FIG. 1, FIG. 3 is a top plan view of the machine shown in FIG. 1 taken along the line 3—3 in FIG. 1, FIG. 4 is an end elevation taken along the line 4—4 in FIG. 1, FIG. 5 is a rear end elevation of the machine shown in FIG 1, and FIG. 6 is a perspective of a blow-molded plastic bottle shown in the inverted position it would have in the machine prior to trimming.

DESCRIPTION OF THE PREFERRED EMBODIMENT

Figure 1:
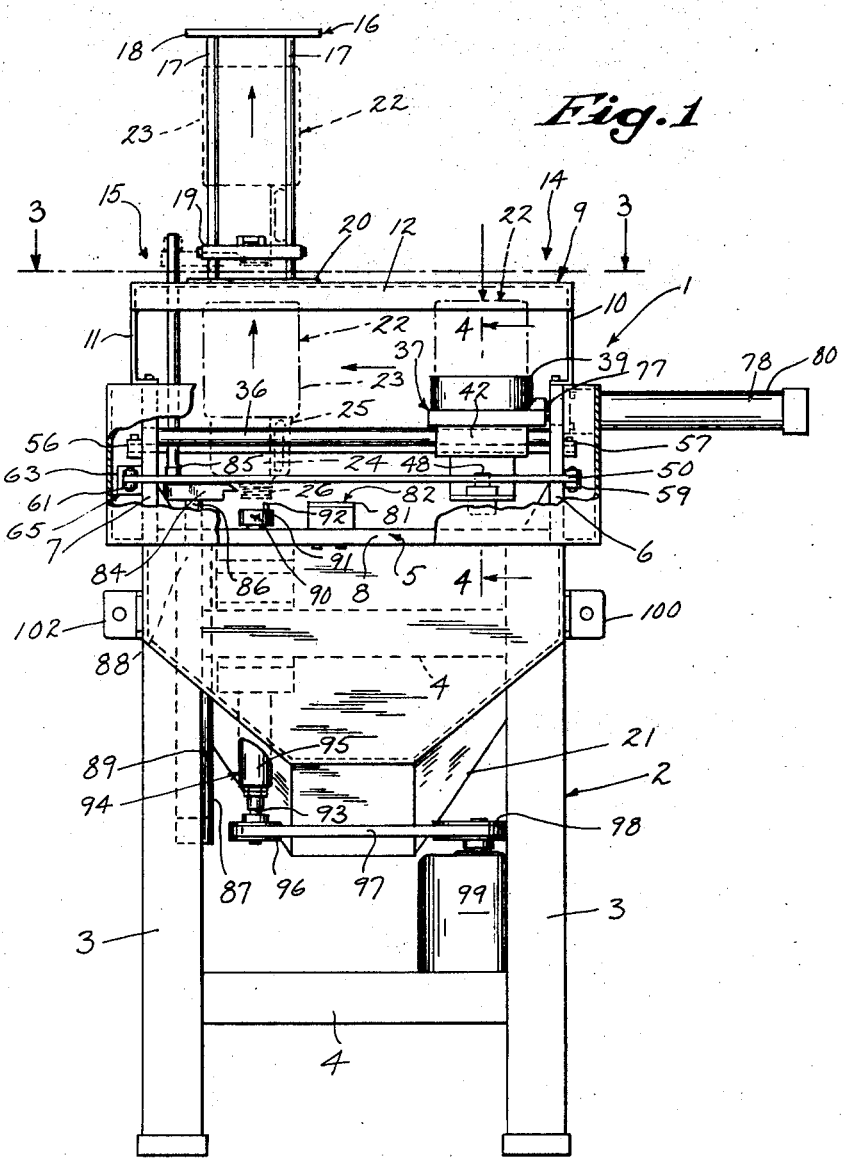
FIG. 1 is a side elevation of the preferred embodiment of the present invention.

The side elevation of the preferred embodiment of the present invention in FIG. 1 shows a trimming machine 1 mounted on a stand 2 which has the usual legs 3 and cross braces 4 to support the trimming machine 1 at a height that is convenient for the operator. The trimming machine 1 has a chassis 5 made up of entrance and discharge end plates 6 and 7, respectively, with the bottom plate 8 that rests on top of the legs. 3. An upper chassis 9 is made up of upper end plate extensions 10 and 11 bolted, respectively, to the tops of the end plates 6 and 7 and connected together at their tops by angle members 12 and 13. The trimming machine 1 may be considered to have an entrance end 14 and a discharge end 15, at which the untrimmed article enters and the trimmed article is discharged from the machine, respectively. An ejection chute 16 made up of four corner rods 17 and cross braces 18, 19 and 20 is mounted on top of the upper chassis 9 at the discharge end 15 of the machine. A sheet metal catcher 21 to collect the waste flashing trimmed by the machine 1 is formed around the chassis 5 and suspends beneath the chassis 5 between the legs 3 of the stand 2.

The preferred embodiment of the invention is set up to trim one gallon blow-molded plastic bottles 22, one of which is illustrated in FIG. 6. As the bottle 22 comes from the blow-molding machine, it has a lower main body portion 23 and an upper restricted portion 24 that is flattened on one side to form a handle 25. A neck 26 of the bottle projects from the upper restricted portion 24 adjacent to the handle and is threaded to receive a cap (not shown). A lateral flashing 27 and 28 adheres about the neck 26 of the bottle and the top of the handle 25. The lateral handle flashing 29 fills the handle hole 30 of the handle 25. A tubular neck extension flashing 31 projects from the end of the neck 26 which is defined by a small groove 32 encircling and defining the mouth of the bottle 22. The lateral flashings 27 and 28 and the handle flashing 29 cling to the bottle 22 by thin, brittle membranes of plastic materials that are easily broken to remove the flashings 27–29. However, the neck extension flashing 31 that extends from the end of the neck 26 is of the same thickness as the neck 26 of the bottle and the mouth groove 32 is relatively shallow so that the neck extension flashing 31 must be cut away instead of broken away.

Turn to the top plan view of the trimming machine 1 shown in FIG. 3. A pair of rods 33 and 34 extend between the end plates 6 and 7 on one side of the chassis 5 and another pair of rods 35 and 36 extend between the end plates 6 and 7 on the other side of the chassis 5. Each pair of rods 33, 34 and 35, 36 forms a set for a carriage 37, and each rod 33–36 may be considered a track. The carriage 37 is made up of a solid yoke 38 that has a circular collar 39 rising from it to receive and support the bottle 22. An opening 40 toward the discharge end 15 of the machine 1 is provided in the collar 39 and yoke 38 to receive ejection apparatus described below. The ends of the yoke 38 are supported on slide blocks 41 and 42, respectively, that ride on the track rods 33, 34 and 35, 36, respectively, which pass through them.

FIGS. 3 and 4 together show reciprocable jaws 43 and 44, slidably mounted, respectively, through portions of the slide blocks 41 and 42 that extend beneath the track rods 33, 34 and 35, 36, respectively. The jaws 43 and 44 are spring biased outwardly by compression springs 45 and 46, respectively, and a cam roller follower 47 and 48, respectively, is mounted on the outer end of each of the reciprocable jaws 43 and 44 that extend beyond the respective slide blocks 41 and 42. The follower rollers 47 and 48, respectively, engage the surfaces of linear cams 49 and 50, that are mounted lengthwise of the chassis 5 on opposite sides of the chassis 5. In addition to the reciprocable jaw 43, a deflashing die 51 is also reciprocably mounted on the slide block 41 with an extension 52 slidably mounted through the slide block 41 and containing a compression spring 53 that normally biases the deflashing die 51 into its outward position. A cam follower roller 54 is mounted on the end of the handle 52 to ride along a linear cam 55 that is mounted on the adjacent side of the chassis 5.

The deflashing die cam 55 is rigidly mounted on bars 56 and 57 that are respectively fastened to the end plates 6 and 7 to project laterally of the end plates 6 and 7. By contrast, the jaw cams 49 and 50 each have their respective ends adjacent the entrance end 14 of the machine pivotally mounted on arms 58 and 59, respectively, that are mounted on the end plate 6 to project therefrom, but the discharge ends of the jaw cams 49 and 50, respectively, are fastened to the ends of piston rods 60 and 61 that project from cylinders 62 and 63 of double acting, pneumatic linear motors 64 and 65 that are fastened to the outside of the discharge end plate 7.

The stationary, deflashing die cam 55 has a lobe 66 that actuates the deflashing die 51 through its follower 54, but the jaw cams 49 and 50 merely have indentations 67 and 68 on the entrance ends that allow the jaws 43 and 44 to open when the carriage 37 is at the entrance end 14 of its path of travel. The reciprocating jaws 43 and 44 have clamping surfaces 69 and 70, respectively, that define a circle the size of the outside diameter of the neck 26 of the bottle 22, but this circle is off center with respect to the jaws 43 and 44 so that one jaw 44 embraces somewhat more than 180° of the circle whereas the other jaw 43 includes somewhat less than 180°. As a result, when the clamping surfaces 69 and 70 close about the neck 26 of the bottle 22, the one clamping surface 69 breaks through the thin membrane holding the lateral flashing 27 and 28 on the neck 26.

Guide blocks 71 and 72 are mounted on the ends of rods 73 and 74 that are adjustably secured in the slide blocks 41 and 42, respectively, so that the guide blocks 71 and 72 can be fixed in any of the desired positions. The guide blocks 71 and 72 serve to receive the bottle 22 and support it in precise location for the clamping jaws 43 and 44, the deflashing die 5 and the other tools that operate on the bottle 22. The top surfaces 75 and 76 of the guide blocks 71 and 72, respectively, are sloped downwardly inwardly so that infinite adjustment of the height of the engaging surfaces 75 and 76 of the guide block with respect to the bottle 22 can be achieved by lateral adjustment of the guide blocks 71 and 72.

The carriage 37 is secured on the end of a piston rod 77 of a double acting linear pneumatic motor 78, which has the rod end 79 of its cylinder 80 fastened to the outside surface of the entrance end plate 6 so that the piston rod 77 can extend through the entrance end 26 and engage the carriage 37. When the slide motor 78 drives the carriage 37 from the entrance end 14 of the machine toward the ejection end 15, the mouth groove 32 in the neck 26 of the bottle strikes a cutting edge 81 of a stationary knife 82, which severs the neck extension flashing 31 as the bottle 22 moves past the knife 82. Other kind of cutting tools may be substituted for the knife 82, such as a moving saw blade or the like, and in short any appropriate cutting means may serve the purpose. When the carriage 37 reaches the end of the stroke at the discharge end 15 of the trimming machine 1, the neck 26 of the bottle impinges upon a concave arcuate surface 83 of an ejection hand 84, the heel end of which slides on a vertical guide rod 85, and is supported on the end of a piston rod 86 of a linear pneumatic motor 87, which has a rod end 88 of its cylinder 89 secured to the bottom side of the base plate 8 of the chassis 5.

Beneath the concave surface 43 of the ejection hand 84 is a reamer 90, which has a cylindrical tool 91 with a reamer blade 92 projecting upwardly from it. The reamer tool 91 is mounted on the end of the piston rod 93 of a rotatable double acting linear motor 94, which has one end of its cylinder 95 fastened to the under surface of the base plate 8. The bottom end of the reamer elevator motor 94 has a belt pulley 96 mounted on it. A drive belt 97 is connected from the pulley 96 on the reamer elevator motor 94 to a drive pulley 98 on the electric motor 99 that is mounted on the stand 2.

Viewing the trimming machine 1 from the outside of its entrance end 14 as in FIG. 2, a directional control valve 100 for controlling the pneumatic slide motor 78 is visible. In the rear view of the machine 1 in FIG. 5, a directional control valve 101 for controlling the reamer elevator 94 and a directional control valve 102 for controlling the cam motors 64 and 65 and ejection motor 87 and for the reamer motor 94, respectively, can be seen. Each of the directional control valves 100–102 is a bistable, two position, solenoid operated valve. These solenoid operated control valves 100–102 are themselves controlled by limit switches actuated by the positions of the carriage 37, the reamer 90 and the ejector hand 84.

To operate the trimming machine, a bottle 22 from the blow molding machine with the flashing 27–29 and 31 on it is inserted through the bottle supporting collar 39 in the carriage 37 when the carriage 37 is at the entrance end 14 of its path, until the bottle rests on the surfaces 75 and 76 of the guide blocks 71 and 72, respectively. If the trimming machine 1 is set up to be controlled by the operator, the operator will actuate the push button to energize carriage slide motor 78 through the control valve 100 to drive the carriage 37 toward the discharge end 15 of its path. As the carriage 37 moves forward, the followers 47 and 48 reach the ends of the indentations 67 and 68 of the linear cams 49 and 50 so that they drive the jaws 43 and 44 together about the neck 26 of the bottle 22, breaking the lateral flashing 27 and 28 away from the neck 26. Next, the follower 54 on the extension 52 of the deflashing die 51 reaches the lobe 66 on the linear cam 55, driving the deflashing die 51 through the handle hole 30 of the bottle knocking out the lateral handle flashing 29.

As the carriage 37 continues toward the discharge end 15 of the machine 1, the follower 54 passes the lobe 66 and the return spring 53 withdraws the deflashing die 51 from the handle hole 30. At about the same time, the mouth groove 32 about the neck 26 of the bottle 22 strikes the cutting edge 81 of the knife 82 so that as the bottle passes over the knife 82 the neck extension flashing 31 is severed from the bottle. When the carriage 37 reaches the discharge end of its path, the bottle neck 26 engages the concave arcuate surface 83 of the ejection hand 84 and the reamer 90 rises up so that the reamer blade 92 is inserted inside of the neck 26 of the bottle to ream it out.

When the reaming is completed and the reaming tool 91 withdrawn, the linear cam motors 64 and 65 are actuated to pivot the linear cams 49 and 50 outwardly so that the return springs 45 and 46 can withdraw the clamping surfaces 69 and 70 of the jaws 43 and 44 from the neck 26 of the bottle 22, releasing the bottle 22. Then the ejection hand 84 is driven upwardly on the guide rod 85 to propel the bottle 22 into the ejection chute 16, where it is held by the support 19. The bottle 22 will be driven further upwardly in the ejection chute 16 by each subsequent bottle. After the bottle has been ejected, the carriage 37 is returned to the entrance end and 14 of the trimming machine by the linear motor 78 where it will be ready to receive another bottle 22.

The sequencing of the operations of the various linear motors is controlled by the solenoid valves 100–102 which in turn are controlled by series of limit switches. If fully automatic operation is desired, the operator's push button may be replaced by a limit switch that is actuated by the insertion of a bottle 22 into the carriage 37. These various steps in the operation of the trimming machine 1 described above happen so rapidly so as to appear to be virtually simultaneous, and thus a sequential description of the various steps may be misleading in creating the impression of a slow step by step operation. The trimming machine 1 made according to the present invention is capable of a high output commensurate with that of the blow molding machines with which it is intended to operate. For different articles, it may be desirable to add additional deflashing dies, which is readily done in the manner described and shown in connection with the deflashing die 51 for removing the handle flashing 29. Precise positioning of the bottle 22 in the carriage 37 is plainly essential for the proper triming operation, and hence, the carriage 37 must be solidly mounted to present the neck 26 of the bottle 22 in the proper location for the reamer 90, the knife 82 and the ejection hand 84. Also, the bottle 22 must be precisely located in the carriage 37 for the correct operation of the jaws 43 and 44 and the deflashing die 51.

Plainly a great many variations may be made in the configurations and mechanisms described above without departing from the scope of the present invention. Therefore, the invention is not to be limited to the specific, preferred embodiment described herein order to comply with the statute, but rather it is to be determined from the claims that follow.

We claim:

1. A trimming machine for molded plastic articles comprising the combination of
    a set of parallel tracks;
    a carriage slidably supported between said tracks for reciprocating movement along a path between an entrance end of said machine and a discharge end of said machine;
    reciprocable jaw means mounted on said carriage to engage a molded article;
    a reciprocable deflashing die mounted on said carriage to remove flashing from said bottle and having a cam follower on it;
    a linear cam mounted on said trimming machine parallel to said parallel tracks to be engaged by said follower means on said deflashing die to cause said flashing die to reciprocate;
    and ejection means to receive said molded article at said discharge end of said trimming machine and to eject said molded article from said trimming machine.

2. A trimming machine as set forth in claim 1 wherein said parallel tracks are comprised of two sets of tracks mounted parallel to each other and spaced apart to receive said carriage between them, and each set of said tracks having two spaced apart parallel tracks.

3. A trimming machine as set forth in claim 2 wherein each of said tracks in each of said sets of tracks is a rod;
    and a pair of slide blocks are mounted so that one of said slide blocks is on each of said carriage and said slide blocks are slidably supported on said sets of tracks.

4. A trimming machine as set forth in claim 2 wherein said reciprocable jaw means are adapted to overlap and close together to trim flashing from said molded article and to hold said molded article between them.

5. A trimming machine as set forth in claim 2 wherein a fixed cutting means is mounted adjacent said path of said carriage to sever said flashing from said molded article as said carriage moves from said entrance end of said machine to said discharge end of said machine.

6. A trimming machine as set forth in claim 2 wherein an adjustable guide block is mounted on said carriage to support said molded article and said adjustable guide block has an inclined upper surface so as to support said molded article at different heights by horizontal adjustment of said guide blocks.

7. A trimming machine as set forth in claim 1 wherein said trimming machine has a catcher mounted on it to receive severed flashings from said molded article.

References Cited

UNITED STATES PATENTS

| 2,992,454 | 7/1961 | Elphee. | |
| 3,060,497 | 10/1962 | Boyer | 225—97 X |
| 3,377,899 | 4/1968 | Wolford | 83—914 X |
| 3,382,531 | 5/1968 | Hager | 83—914 X |

FRANK T. YOST, Primary Examiner

U.S. Cl. X.R.

29—33; 83—425, 914; 225—97, 103

PO-1050
(5/69)

UNITED STATES PATENT OFFICE
CERTIFICATE OF CORRECTION

Patent No. 3,494,520          Dated February 10, 1970

Inventor(s) Robert A. Bewalda, Jr.; Robert L. O'Brien; Robert L. Schoeneck

It is certified that error appears in the above-identified patent and that said Letters Patent are hereby corrected as shown below:

Column 2, Line 41, after "legs" remove ---(.)---

Column 4, Line 18, after "kind" add --- s ---

Column 5, Line 24, after "end" delete ---and---

Column 5, Line 45, change "triming" to ---trimming---

Claim 3, Column 6, Line 27, after "each" insert ---end---

SIGNED AND
SEALED
JUL 14 1970

(SEAL)
Attest:

Edward M. Fletcher, Jr.
Attesting Officer

WILLIAM E. SCHUYLER, JR.
Commissioner of Patents